US006789176B2

United States Patent
Uriu et al.

(10) Patent No.: US 6,789,176 B2
(45) Date of Patent: *Sep. 7, 2004

(54) ADDRESS RELEASE METHOD, AND COMMON BUFFERING DEVICE FOR ATM SWITCHING SYSTEM WHICH EMPLOYS THE SAME METHOD

(75) Inventors: Shiro Uriu, Kawasaki (JP); Masanobu Furukoshi, Kawasaki (JP); Tetsuaki Wakabayashi, Kawasaki (JP); Kazumasa Sonoda, Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,332

(22) Filed: Apr. 5, 1999

(65) Prior Publication Data

US 2002/0145995 A1 Oct. 10, 2002

(30) Foreign Application Priority Data

Jun. 15, 1998 (JP) .......................................... 10-166891

(51) Int. Cl.[7] .............................................. G06F 12/06
(52) U.S. Cl. ....................... 711/154; 370/351; 370/431; 370/395.72
(58) Field of Search ............................... 710/1; 370/396, 370/395.1, 431, 389, 395.32, 443, 351, 362, 364, 395.7, 395.72; 712/36; 709/232, 233; 711/154, 170

(56) References Cited

U.S. PATENT DOCUMENTS 5,504,741 A * 4/1996 Yamanaka et al. .......... 370/412

5,572,522 A * 11/1996 Calamvokis et al. ....... 370/390
5,710,770 A * 1/1998 Kozaki et al. ............... 370/368

(List continued on next page.)

FOREIGN PATENT DOCUMENTS

| EP | 0966174 | * 12/1999 | |
| EP | 0 966 174 A2 | * 12/1999 | |
| JP | 4-175034 | 6/1992 | |
| JP | 9-91172 | 4/1997 | |
| JP | 20000004233 A | * 1/2000 | ........... H04L/12/28 |

OTHER PUBLICATIONS

"Multicast/Broadcast Mechanism for a Shared Buffer Packet Switch", IBM Technical Disclosure Bulletin, vol. 34, No. 10A, pp. 464–465, Mar. 1992.*
Mizukoshi et al., "A Single-Chip Controller for 1.2 Gbps Shared Buffer ATM Switches", IEEE 1997 Custom Integrated Circuits Conference, pp. 22.2.1–22.2.4, 1997.*

(List continued on next page.)

Primary Examiner—Pierre-Michel Bataille
(74) Attorney, Agent, or Firm—Katten Muchin Zavis Rosenman (57) ABSTRACT

In a common buffering device with a simple arrangement, a write address can be efficiently released from a buffer memory upon receipt of a multi-address call. For an ATM cell which is to be transmitted to a specific line, a write address is set in a common buffer memory, and the ATM cell is written at the write address. The ATM cell is read from an address which corresponds to the write address, and is transmitted to the specific line. Then, the pertinent write address is released. In a write table are entered a plurality of multi-address lines across which an ATM cell written at a specific address in the common buffering device can be multicast. Each time the ATM cell is read from the specific address, a designation line for transmission of an ATM cell in a read control table is compared with the multi-address lines set in the write control table. When the lines match, the write address for the ATM cell, which is set in the write control table, is released.

7 Claims, 12 Drawing Sheets

U.S. PATENT DOCUMENTS

| | | | | |
|---|---|---|---|---|
| 5,745,489 A | * | 4/1998 | Diaz et al. | 370/395 |
| 5,898,687 A | * | 4/1999 | Harriman et al. | 370/390 |
| 5,903,544 A | * | 5/1999 | Sakamoto et al. | 370/218 |
| 5,963,552 A | * | 10/1999 | Joo et al. | 370/395.32 |
| 6,011,793 A | * | 1/2000 | Smith | 370/363 |
| 6,016,317 A | * | 1/2000 | Sakurai et al. | 370/391 |
| 6,101,187 A | * | 8/2000 | Cukier et al. | 370/396 |
| 6,339,596 B1 | * | 1/2002 | Kozaki et al. | 370/395.7 |
| 6,385,198 B1 | * | 5/2002 | Ofek et al. | 370/389 |
| 2002/0099900 A1 | * | 7/2002 | Kawarai et al. | 710/317 |

OTHER PUBLICATIONS

Schultz et al., "Physical Performance Limits for Shared Buffer ATM Switches", ACM Transactions on Communications, vol. 45, pp. 997–1007, Aug. 1997.*

Chiueh et al., "Design and Evaluation of A DRAM–based Shared Memory ATM Swittch" ACM Transactions on Computer Systems, pp. 248–259, 1997.*

* cited by examiner

TAG information

| MC | 1 | 2 | 3 | 4 |
|----|---|---|---|---|
| 1  | 0 | 1 | 0 | 1 |

| HW 0 | |
|---|---|
| HW 1 | X |
| HW 2 | X X |
| HW 3 | X X X |
| HW 4 | X X X X |
| HW 5 | X X X X X |
| HW 6 | X X X X X X |
| HW 7 | X X X X X X X |

FIG. 6A

| BIT SET HW | HW USED FOR COMPARISON |
|---|---|
| 0 | – |
| 4 | 0 |
| 1 | 0, 4 |
| 5 | 0, 4, 1 |
| 2 | 0, 4, 1, 5 |
| 6 | 0, 4, 1, 5, 2 |
| 3 | 0, 4, 1, 5, 2, 6 |
| 7 | 0, 4, 1, 5, 2, 6, 3 |

ADDRESS RELEASE METHOD, AND COMMON BUFFERING DEVICE FOR ATM SWITCHING SYSTEM WHICH EMPLOYS THE SAME METHOD

BACKGROUND OF THE INVENTION

1. Field of the Invention

The present invention relates to an address release method and to a common buffering device for an ATM (asynchronous transfer mode) switching system which employs the address release method.

2. Related Arts

An ATM switching system, which employs a common buffering device, manages for each output highway (HW) a write address and a read address which are used by the buffering device to implement a process for the switching of cells.

Figure 10:
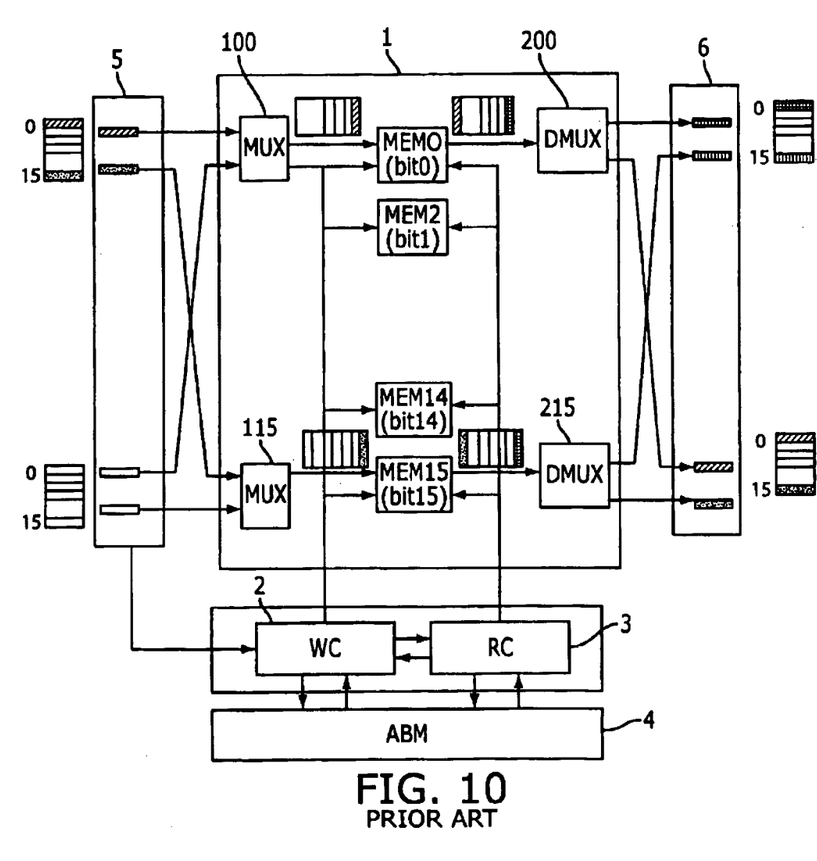
FIG. 10 is a diagram for explaining the arrangement and operation of the common buffering device of an ATM switching system.

In FIG. 10 is an example arrangement for a common buffering device included in an ATM switching system. A cell buffering module 1 is connected to a highway line side via highway interfaces 5 and 6.

In the cell buffer module 1, a centrally located cell buffer memory consists of 16 buffer memories MEM0 to MEM15, and multiplexers (MUX) 100 to 115 and demultiplexers (DMUX) 200 to 215, which are included in a number equivalent to the buffer memory count.

A write controller 2 and a read controller 3 are included as common buffer controllers, and an address buffer memory 4 is provided in association with the write controller 2 and the read controller 3.

Each cell in the cell buffer memory has a capacity of 128K, and holds ATM cells stored in a bit slice form. Further, each bit of the 16 parallel bit sets constituting the ATM cell corresponds to one of the 16 buffer memories MEM0 to MEM15 which form the cell buffer memory.

Since in an ATM cell there are 64 bytes, if it is arranged into 16 parallel bit forms, its 32 clock width is the equivalent of the time for one cell. For bit slicing, a data set of 32 bits per clock, which is obtained by developing individual bits in parallel, is employed as the unit of control for processing.

That is, in FIG. 10, the ATM cell transmitted across each highway line for the highway interface 5 is divided into 16 bit slices each of which has a 32 bit width. The bit slices having the 32 bit widths are transmitted in parallel to the cell buffer module 1.

In the cell buffer module 1, identically numbered bits of the bit slices received in parallel are multiplexed by the multiplexers MUX. That is, in FIG. 10, for example, of the 16 bit slices the multiplexer (MUX) 100 multiplexes the 1st bit which corresponds to the first bit of an ATM cell, and the multiplexer (MUX) 115 multiplexes the 16th bit slice.

The bit slices multiplexed by the multiplexers (MUX) 100 to 115 are stored in parallel in the 16 buffer memories MEM0 to MEM15 for corresponding bits. The storage address is set by the write controller 2 of the common buffer controller.

The storage address set by the write controller 2 is stored in the address buffer memory 4. The read controller 3 of the common buffer controller provides, as a read address, an address which corresponds to a write address, and 16 bit slices having a 32 bit width are read in parallel from the read address.

The 16 bit slices read in parallel are separated by the demultiplexers (DMUX) 200 to 215, and are transmitted via the highway interface 6 to the destination lines.

Figure 11:
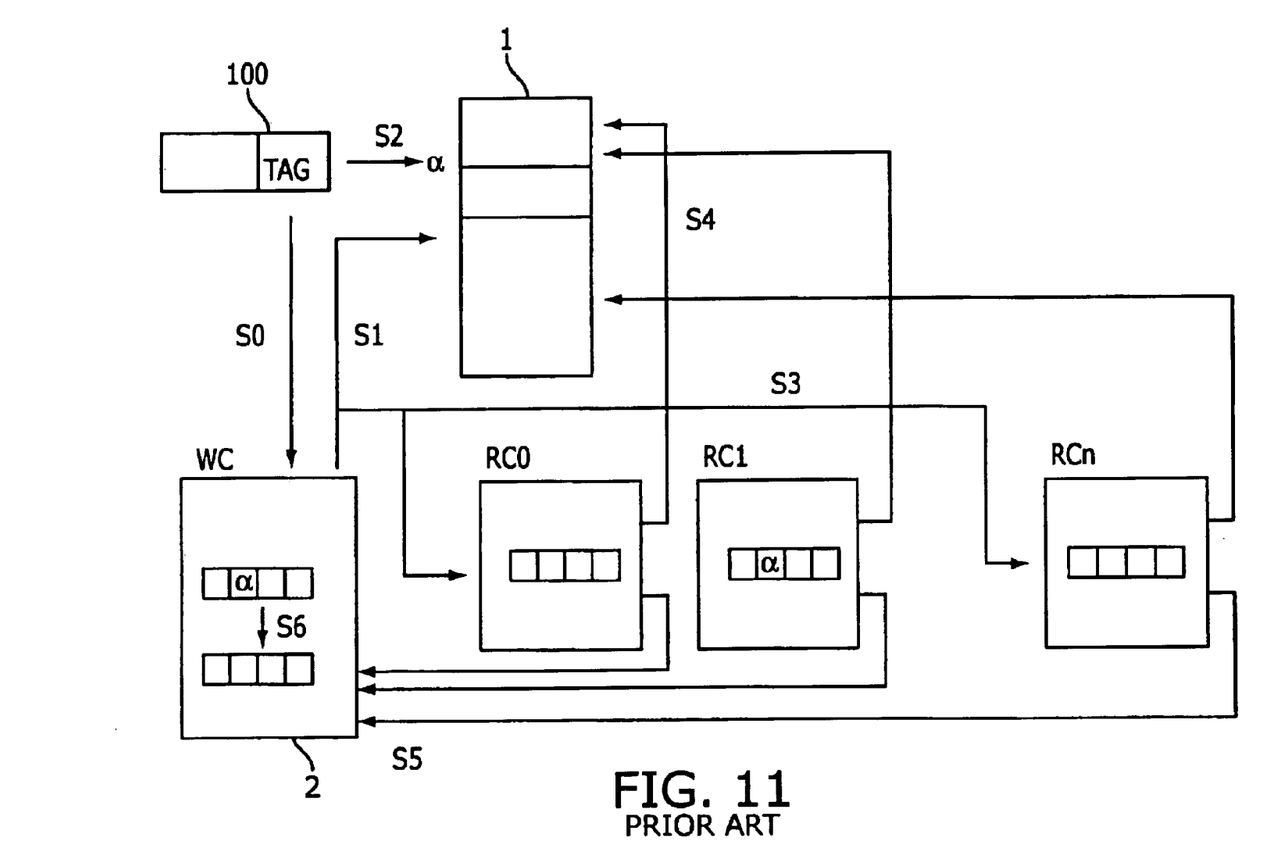
FIG. 11 is a diagram for explaining a problem caused by the multi-address communication process in FIG. 10.

FIG. 11 is a diagram for explaining the procedures performed by the write controller 2 for setting and releasing the storage addresses. In FIG. 11, the ATM cells from the multiplexers (MUX) 100 to 115 are input (step S0) and TAG information for the cells is analyzed by the write controller 2, and an empty address α is defined as a write address α (step S1) and is written in the address buffer memory 4.

Then, the cell data are written at the write address α, which is set in the memories MEM0 to MEM14 in the cell buffer module 1 (step S2). The write controller 2 transmits as a read address the write address to the read control circuits RC1 to RCn, of the read controller 3, which correspond to the highway lines along which cell data to be read from the TAG information for the cell 100 is written to the address α (step S3).

The read control circuits RC1 to RCn of the read controller 3 sequentially write received read addresses in the FIFO memory. The read control circuits RC1 to RCn then access read addresses a set by corresponding lines in the order in which they are written, and read the cell data therefrom (step S4).

The read control circuits RC1 to RCn further notify the write controller 2 of the read address α at which cell data has been read (step S5).

Upon receipt of the read address α, the write controller 2 deletes and releases a corresponding write address α from the address buffer memory 4 (step S6).

As is described above, the write address of the cell buffer module 1 is released when the ATM cell is read from the buffer memories MEM0 to MEM15 by the read controller 3 and is transmitted to the highway line. The released address is stored as a write address for the ATM cell which will arrive next.

When the reading is performed along a specific line, and when the ATM cell is read from the buffer memory MEM0 to MEM15 and is transmitted to the line, the write address of the buffer module 1 is released and is stored as a write address for the ATM cell which will arrive next. In the conventional system, a problem will arise when the received ATM cell is a multi-address call for transmitting the same cell to a plurality of lines.

Specifically, when the ATM cell is a multi-address communication call, releasing the address is not a simple operation, even when the ATM cell is read from a specific line. The address can not be released unless the reading is completed for all the lines for which the ATM cell should be copied. To resolve this problem, various methods have been proposed.

As previously described, as its depth the cell buffer module 1 in FIG. 10 has a capacity of 128K. Accordingly, the address buffer memory 4 has a large capacity. Therefore, while taking into account how the common buffer device which uses an LSI (large scale integration) is formed, providing such a large memory in the LSI is not advantageous.

An effective method by which this can be effected is for the large memory to be constituted by using an external memory. However, when this is done, another problem arises as a result of the difference in the access speed of the external memory and the signal processing speed of the LSI.

SUMMARY OF THE INVENTION

It is, therefore, one objective of the present invention to provide an address release method whereby, with a simple arrangement for which a high-speed memory is employed, a write address can be efficiently released from a buffer memory upon receipt of a multi-address call, and a common buffering device can be used for an ATM switching system which employs this address release method.

To achieve the above objective, according to one aspect of the present invention, a method for releasing an address in a common buffering device includes the steps of:

setting for an ATM cell which is to be transmitted to a specific line a write address for the common buffer memory;

writing the ATM cell at the write address;

reading the ATM cell from an address which corresponds to the write address;

transmitting the ATM cell to the specific line; and releasing the write address in the common buffering device.

Furthermore, as the feature of the present invention, in a write table are entered a plurality of multi-address lines across which an ATM cell written at a specific address in the common buffering device can be multicast. Each time the ATM cell is read from the specific address, a designation line for transmission of an ATM cell in a read control table is compared with the plurality of multi-address lines set in the write control table. When the lines match, the write address for the ATM cell, which is set in the write control table, is released.

According to another aspect of the present invention, when the destination line for the transmission of the ATM cell in the read control table does not match the plurality of multi-address lines set in the write control table, to update the read control table, a line to which the ATM cell has been transmitted is added to the read control table.

According to an additional aspect of the present invention, in a write table are entered a plurality of multi-address lines across which is multicast an ATM cell written at a specific address in the common buffering device. A check is performed in advance to determine whether the same read addresses are present that have occurred during the period of time allocated for one cell, and bit sets are generated in the read control table. Each time the ATM cell is read from the specific address, a corresponding bit set in the read control table is compared with the plurality of multi-address lines set in the write control table. When the bit set and the lines match, the write address which is set in the write control table for the ATM cell is released.

According to a further aspect of the present invention, the bit set is acquired by sequentially determining whether a read address for each adjacent read line is matched.

The basic structure of a common buffering device, which employs the above described address release method, comprises:

a common buffer memory;

a write controller for setting in the common buffer memory an address to which an ATM cell which is to be transmitted to a predetermined line is to be written;

a read controller for reading the ATM cell from the address set by the write controller, and for transmitting the ATM cell to a corresponding line;

a write control table wherein is set a plurality of multi-address communication lines to which are multicast an ATM cell read from a specific address in the common buffering device; and a read control table for, each time the ATM cell is read for which the plurality of multi-address communication lines are set, setting a destination line to which the ATM cell is to be transmitted.

According to still another aspect of the present invention, the write controller compares the multi-address lines in the write control table with the line which is set in the read control table and to which the ATM cell is to be transmitted. When the lines match, the write address set by the write controller is released.

According to still an additional aspect of the present invention, the common buffer memory, the write control table and the read control table are constituted by an external memory.

According to a still further aspect of the present invention, the write controller comprises:

a register in which are sequentially set data indicating a destination line for the transmission of the ATM cell which is read by the read controller;

a bit map generator for reading an ATM cell written at the same address in the common buffer memory, and for generating a bit map which designates a transmission destination line;

a comparator for performing a comparison of the bit map generated by the bit map generator with a corresponding highway line in the write control table, for which the same write address has been set; and a controller for, upon receipt of the result of the comparison, feeding back to the register the data indicating which transmission destination highway line has been read for the ATM cell, or for clearing the contents of the write control table.

Other objectives and features of the invention will become apparent during the course of the following explanation of the preferred embodiment of the present invention.

DETAILED DESCRIPTION OF THE PREFERRED EMBODIMENT

The preferred embodiment of the present invention will be described while referring to the accompanying drawings. The same reference numerals or symbols are used throughout to denote corresponding or identical components.

Figure 1:
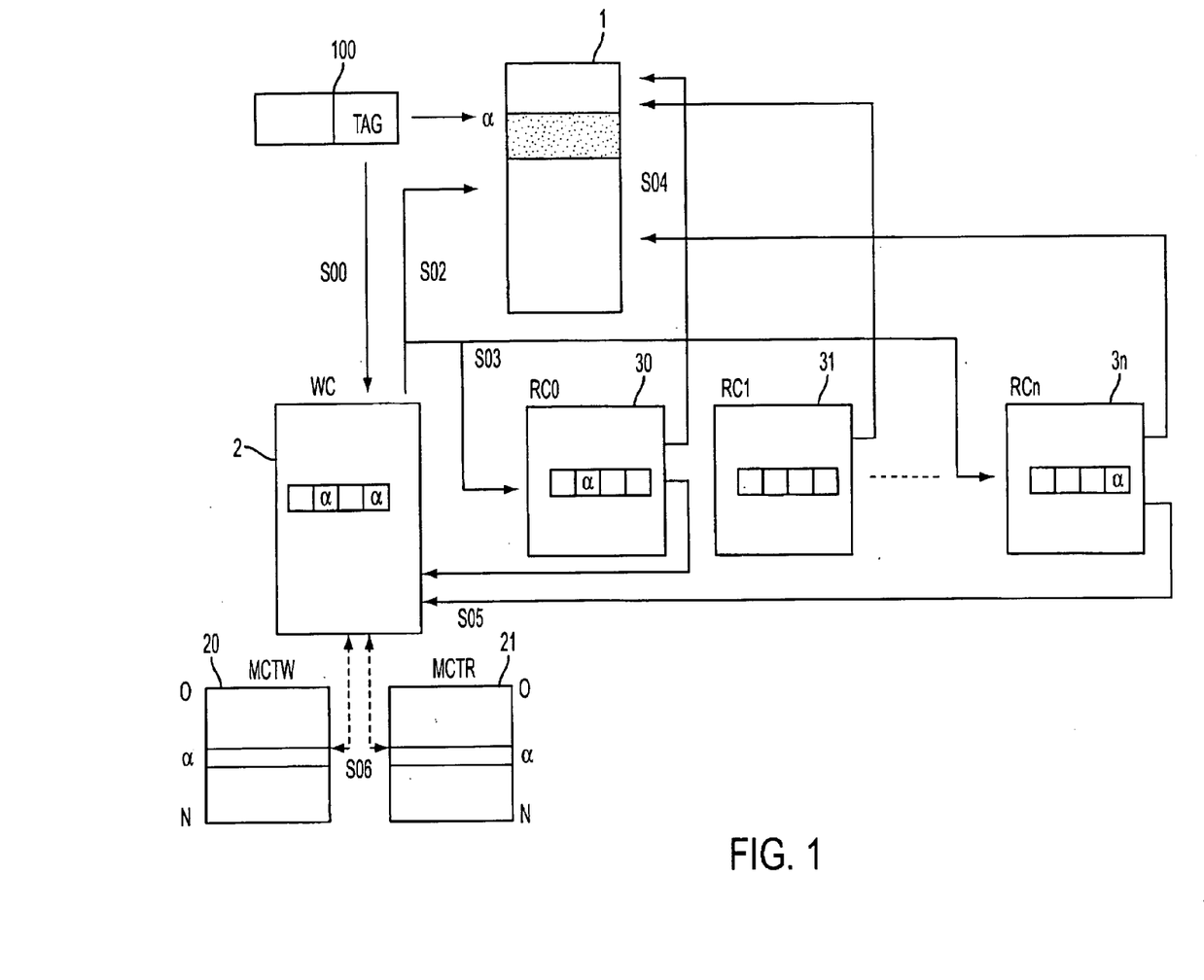
FIG. 1 is a block diagram illustrating a method for releasing an address in a common buffering device according to one embodiment of the present invention.

FIG. 1 is a block diagram illustrating the arrangement for carrying out the address release method for a common buffering device according to one embodiment of the present invention. An explanation will be given for the common buffering device shown in FIG. 1, especially for the address release processing performed by the common buffer controller, which includes the write controller 2 and the read controller 3, features of the present invention.

A feature of the present invention is that in the arrangement are provided a write control table 20 and a read control table 21. The write control table 20 and the read control table 21 can be stored as external memories in an address buffer memory 4 (see FIG. 10).

When an ATM cell 100 is received, the write controller 2 reads the TAG information in the ATM cell (step S00) and determines whether the ATM cell is a multi-address communication call. If the ATM cell is a multi-address communication call, destination lines are confirmed.

Figure 2:
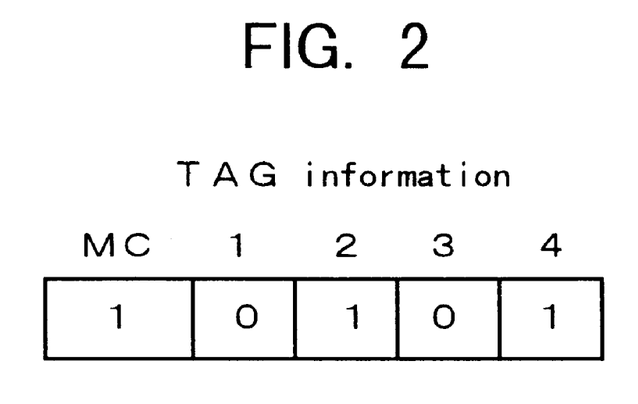
FIG. 2 is a diagram for explaining example TAG information.

Example TAG information included in an ATM cell is shown in FIG. 2. When the ATM cell is a multi-address communication call, a multi-address call instruction bit MC is set to 1. Further, a destination highway line number is set to 1. In the example in FIG. 2, highway lines 2 and 4 are set to 1, and the ATM cell is multicast to these lines.

When it is ascertained from the TAG information that the ATM cell is a multi-address call and the destination lines are confirmed, the write controller 2 searches for an empty address. An empty address α in the write control table (MCTW) 20 is set as a write address α (step S01).

The write control table 20 includes N addresses, and a line, or lines, for which a channel should be set, i.e., a line to which the ATM cell should be multicast is set to "1" at the designated write address α. In accordance with the TAG information in FIG. 2, the lines 2 and 4 are set to 1.

The write controller 2 accesses the designated address α in the buffer memories MEM0 to MEM14, which are prepared as external memories in this invention, so that a received ATM cell can be stored at the address α (step S02).

At the same time, of the read control circuits (RC0 to RCn) 30 to 3n in the read controller 3, the write controller 2 notifies one read control circuit, which corresponds to the destination line, that the address α is a read address α (step 03).

The read control circuits (RC0 to RCn) 30 to 3n each include an FIFO memory, in which a read address received from the write controller 2 is sequentially stored. The addresses are read in the order in which they were stored, and the buffer memories MEM0 to MEM14 are accessed in order to read an ATM cell.

Therefore, the read control circuits (RC0 to RCn) 30 to 3n, in accordance with the sizes of the queues of read addresses which are stored in the FIFO memories, have different timings at which to access the buffer memories MEM0 to MEM14.

Thus, upon receiving the read address α, the read control circuits 30 to 3n, in consonance with the different timings, read an ATM cell stored at the address α (step S04).

The ATM cell data which are read are transmitted via a highway interface 6 (see FIG. 10, not shown in FIG. 1). The read control circuits 30 to 3n return the address α, at which the ATM cell data were read, to the write controller 2 (step S05).

The write controller 2 sets a "1" (sets a flag) for a line along which the multi-address cell was transmitted, at the read address α, which is included in the read control table 21 stored in the external memory and is returned by the read controller 3.

Following this, the write controller 2 compares the line for which the write address α of the write control table 20 is registered with the contents of the line along which the multi-address ATM cell of the read control table 21 has been transmitted. When the contents match, the write address α is released (step S06).

Figure 3:
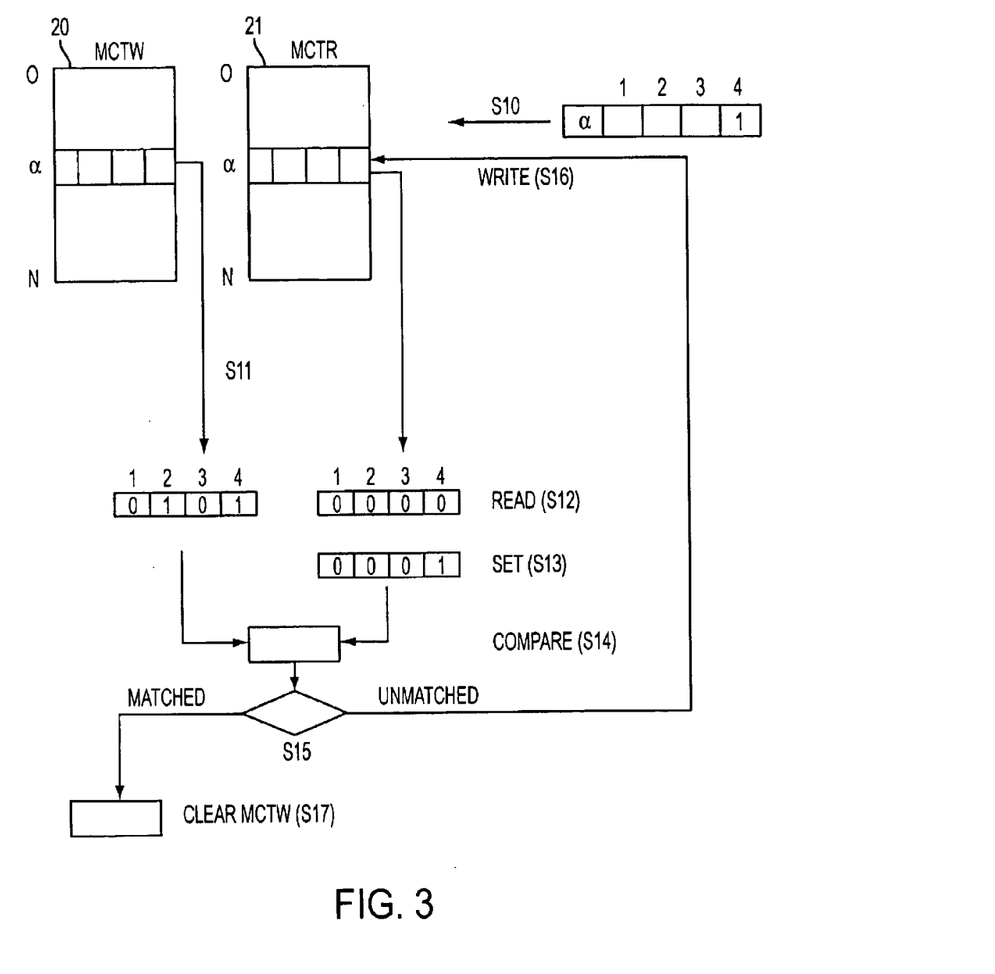
FIG. 3 is a flowchart showing the processing performed, using the method employed to release an address in the common buffering device, in order to perform a multi-address communication process involving a plurality of lines.

FIG. 3 is a detailed diagram showing the processing performed by the address release method for the common buffering device of this invention in order to provide a multi-address communication service for a plurality of lines. In particular, a detailed explanation is given for a comparison of the contents of the write control table 20 with those of the read control table 21. In this embodiment, it is assumed that the address buffer module 1 has 4×4 switches, and accordingly, four lines, 1 to 4, are connected thereto. It is further assumed that of the lines 1 to 4 the ATM cell is multicast to lines 2 and 4.

The pertinent write control circuit of the write controller 3 reads an ATM cell at the address α in the buffer memories MEM0 to MEM15, and notifies the write controller 2 that the ATM cell has been transmitted to line 4 (step S10).

Upon receiving this notification, the write controller 2 reads information for the lines (lines 2 and 4) for which the address α has been set by the write control table 20 and to which the ATM cell is multicast, and sets them in the register (step S11). At the same time, the write controller 2 reads information for the ATM cell destination lines, which are read from the address α recorded in the write control table 20 (step S12).

At this time, since the ATM cell destination line, which is read from the address α recorded in the read control table 21, is not yet available, the lines 1 to 4 are set to "0."

Then, since at step S10 the line 4 is the cell transmission line which is indicated when the read address α is returned, in the register a bit position which corresponds to the line 4 is set to "1" (step S13).

The states of the registers which are set at steps S11 and S13 are compared.

Whether the registers match or not is determined by comparing them (step S15). When the states of the registers do not match, the state of the register set at step S13 is recorded in the read control table 21 (step S16) and a notification that another multi-address line ATM cell has been read is waited for. The same processing as was previously performed is thereafter repeated.

When at step S15 the states of the register match, i.e., when the ATM cell has been transmitted to all the multi-address destinations, the pertinent write address α in the write control table 20 and the associated multi-address destination information are cleared (step S17). Therefore, the write address α is freed and can be set as a write address for the next ATM cell that is received.

When the write control table 20 and the read control table 21 are constituted by an external memory, the relationship between the memory access time and the actual processing time must be taken into consideration. When 4×4 switches are provided, the number of cells which are read during one cell time period is one for each highway line, and a maximum of four cells are read. Therefore, four read addresses are generated.

To determine whether an address should be released, the write controller 2 includes in a window one read process (step S12) and one write process (step S16). For the four addresses, four read processes and four write processes are included, and four windows are required.

Figure 4:
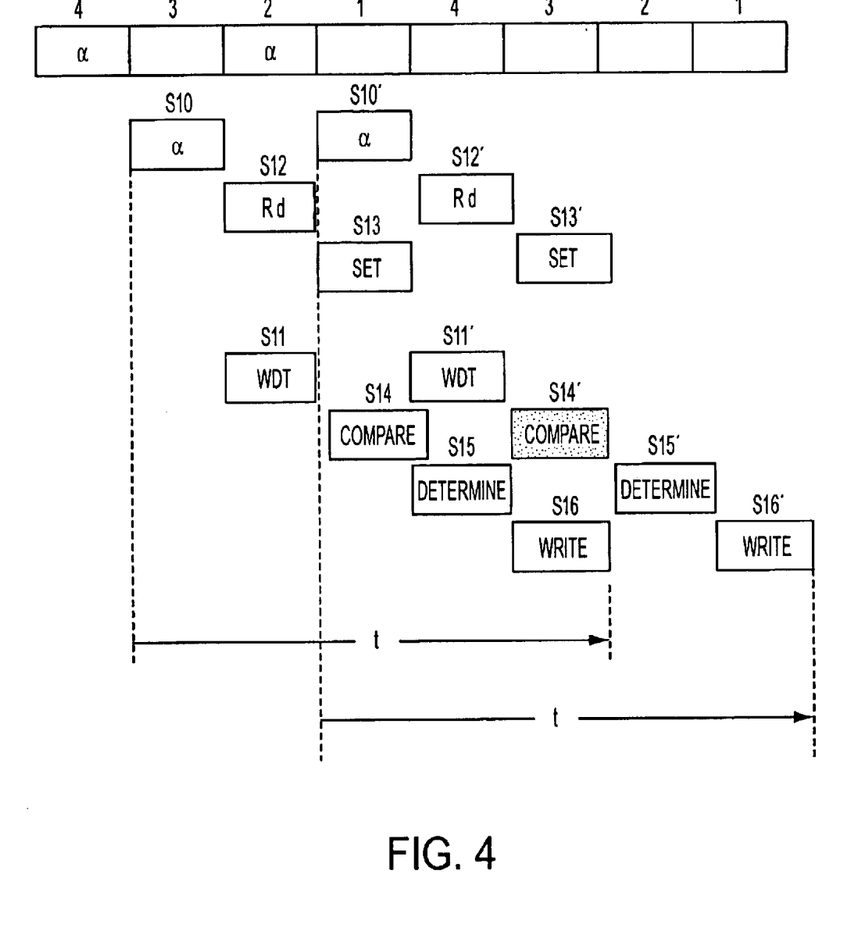
FIG. 4 is a time chart corresponding to the flowchart in FIG. 3.

FIG. 4 is a time chart corresponding to the processing in FIG. 3. The reference numerals for the steps in FIG. 4 correspond to those for the processing in FIG. 3. In the embodiment shown in FIGS. 3 and 4, it is assumed that the processing in FIG. 3 is performed upon the receipt from the read controller 3 of a notification (step S10) that an ATM cell has been multicast to line 2.

At the time at which the information set in the write control table 20 is compared with the information stored in the read control table 21 (step S14), the write operation to the read control table 21 for line 4 has not yet been performed (step S16).

Therefore, an error in the determination logic concerning the results of the comparison occurs. In this case, the address $\alpha$ set for the multi-address ATM cell will not be released even when the ATM cell has been transmitted to all the destination lines.

Figure 5:
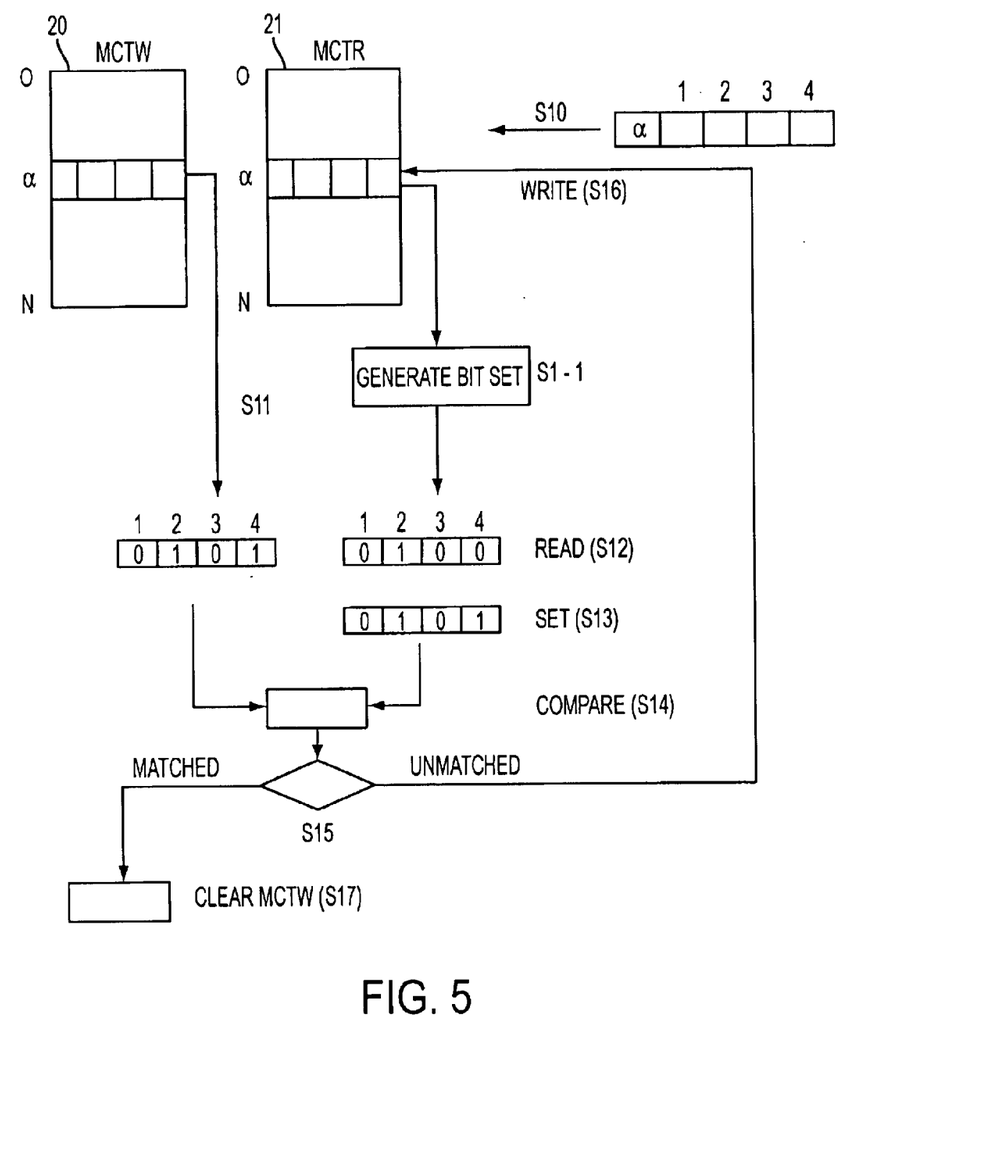
FIG. 5 is a diagram for explaining the embodiment of the present invention.

FIG. 5 is a flowchart for explaining the processing for the embodiment to resolve such a problem. Bit set generation step S1-1 is added to the processing in FIG. 3.

In the bit set generation process, whether the same read addresses which are generated during a one cell time period are present is determined in advance for the generation of a bit set. Then, the processing as explained while referring to FIG. 3 is performed.

The processing in FIG. 4 differs from that in FIG. 3 in that, when at read step S12 the read address $\alpha$ for line 4 is returned, a line which was read at the same address $\alpha$ during the previous reading process has already been determined by using a bit set.

The bit set generation process will now be described while referring to FIGS. 6A and 6B. The example in FIGS. 6A and 6B copes with up to 8×8 switches. Each time a read address for an ATM cell for 8 highway lines is returned from the read controller 3, the write controller 2 compares the recently received read address with a read address which was received earlier.

Figure 6A:
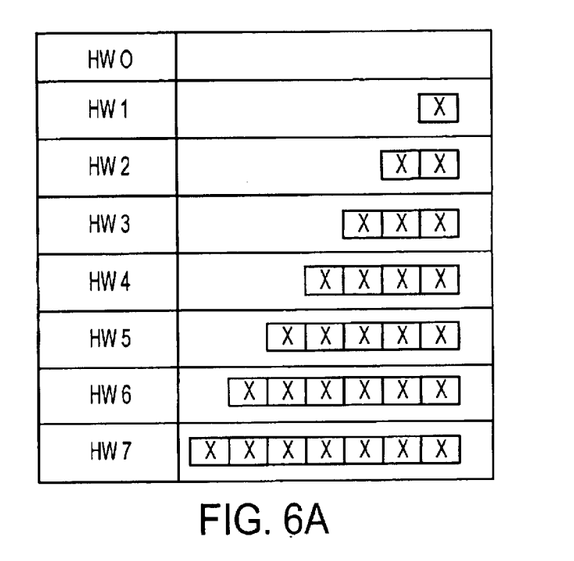
FIG. 6 is a diagram for explaining the generation of a bit set in FIG. 5.
Figure 6B:
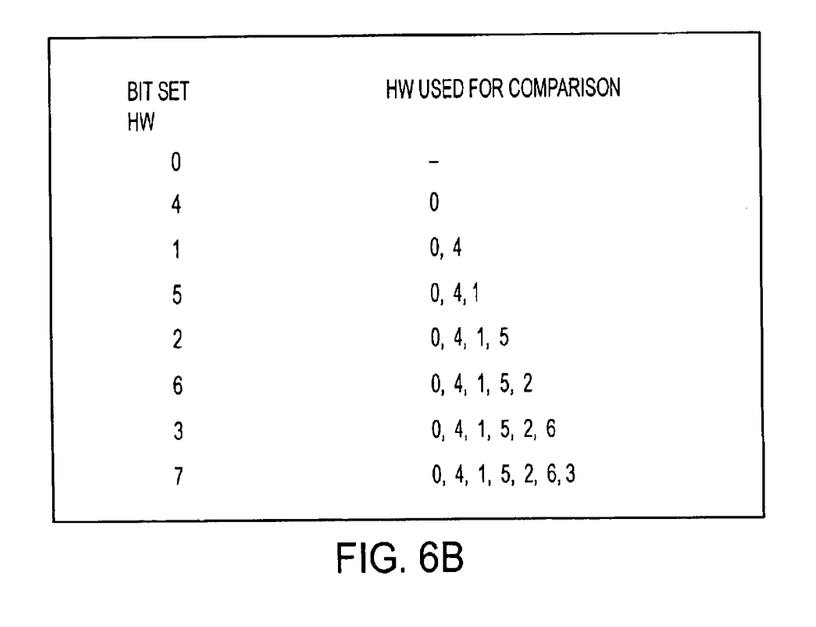

In FIG. 6B, a highway line (HW) for an address which is transmitted to a comparison destination is shown relative to a corresponding highway line 0 to 7, which is an object of a bit set.

For example, highway line 0 is a highway used for comparison with the highway line 4 which is an object of a bit set, and highway lines 0 and 4 are those used for comparison with a highway line 1 which is an object of a bit set.

For this comparison, when the highway line has the same address as a read address for an ATM cell as has the comparison destination, in a position x in FIG. 6A a "1" is set to constitute a bit map.

Referring again to FIG. 5, at step S12 the data read from the read control table 21 indicate that an ATM cell has already been read from the read address $\alpha$ for line 2.

At step S13, for line 4 a "1" is set. The processing explained in FIG. 3 is thereafter performed.

In this manner, a bit map is generated in advance during a one cell time period. Then, before the processing in FIG. 5 is performed, at step S12 a bit position which represents the same address as a local address $\alpha$, which was read and which corresponds to a line along which data was read earlier than the local reading time, and a bit position which corresponds to the local line are set to "1."

Therefore, as is explained while referring to FIG. 4, the logical contradiction can be avoided which occurs when the writing and the updating of the contents of the read control table 21 are delayed, even though the determination obtained by the data comparison has already been made.

Figure 7:
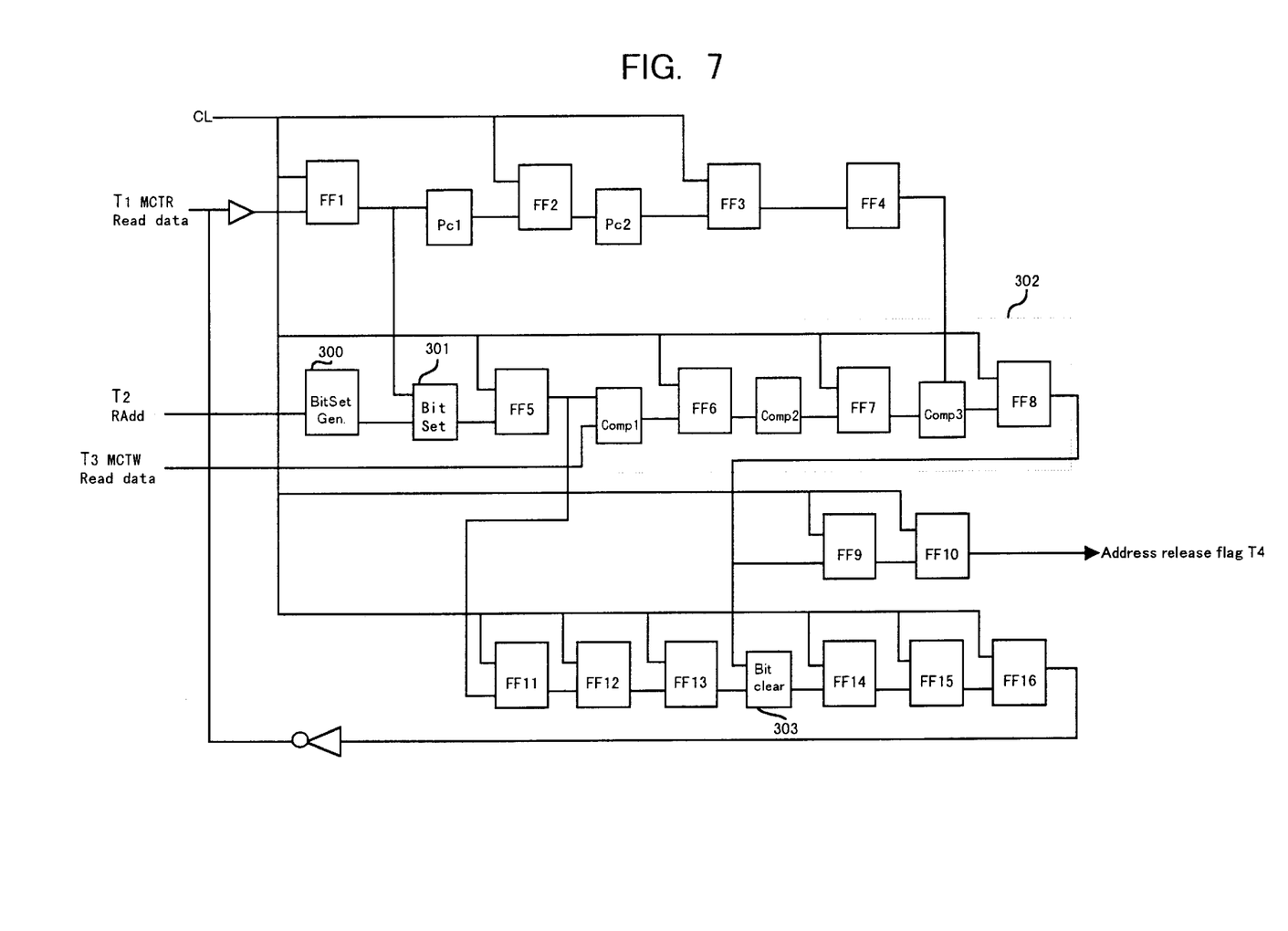
FIG. 7 is a block diagram illustrating an example arrangement of a data processor for a multi-address communication write table according to the embodiment of the present invention.

In FIG. 7 is shown the arrangement of the multi-address call processor which is included in the read controller 3 and which performs the processing in FIG. 6.

With this arrangement, data from the read controller 3 are transmitted to a terminal $T_1$, and a read address from the read controller 3 is transmitted to a terminal $T_2$. The data read from the write control table 20 are transmitted to a terminal $T_3$.

A bit set generator 300 includes flip-flops FF20 to 28 and address comparators 310 to 316. This example employs 8×8 switches, and the states of the multi-address destinations for highway lines (HW) 0 to 8 are set so as to correspond to the states of the flip-flops FF20 to 27, and are transmitted to the address comparators 310 to 316.

The address comparators 310 to 316 compare the output of the flip-flop $FF_{20}$ with that of the respective flip-flops $FF_{21}$ to $FF_{27}$ at the following stages.

When the outputs are matched, a "1" is output and is set to the flip-flop 28. Thus, the bit setting explained in FIG. 6A can be obtained.

Referring again to FIG. 7, the output of the bit set generator 300 is transmitted to a bit set circuit 301, which is a register, and is paired with the output of the flip-flop FF1. This processing corresponds to steps S12 and S13 in FIG. 5.

The comparator 302, which is constituted by three comparators COMP1 to COMP3 and the flip-flops FF6 to FF8, compares the output of the write control table 20 with the output of the bit set circuit 301, which is received via the flip-flop FF5. This process corresponds to step S14 in FIG. 5.

When as a result of the comparison by the comparator 302 it is found that the outputs match, it is assumed that the ATM cell has been transmitted to all the multi-address lines, and the address can be released. Therefore, at this time an address release flag is output to the terminal $T_4$. In accordance with the address release flag, the write controller 2 releases the designated address. This process corresponds to step S17 in FIG. 5.

When the data do not match, it is assumed that the ATM cell has not yet been transmitted to all the multi-address lines, and the data are fed back through the flip-flops $FF_{11}$ to $FF_{16}$ and a bit clear circuit 303 to set the flip-flops $FF_1$ to $FF_4$. This process corresponds to step S16 in FIG. 5.

Figure 8:
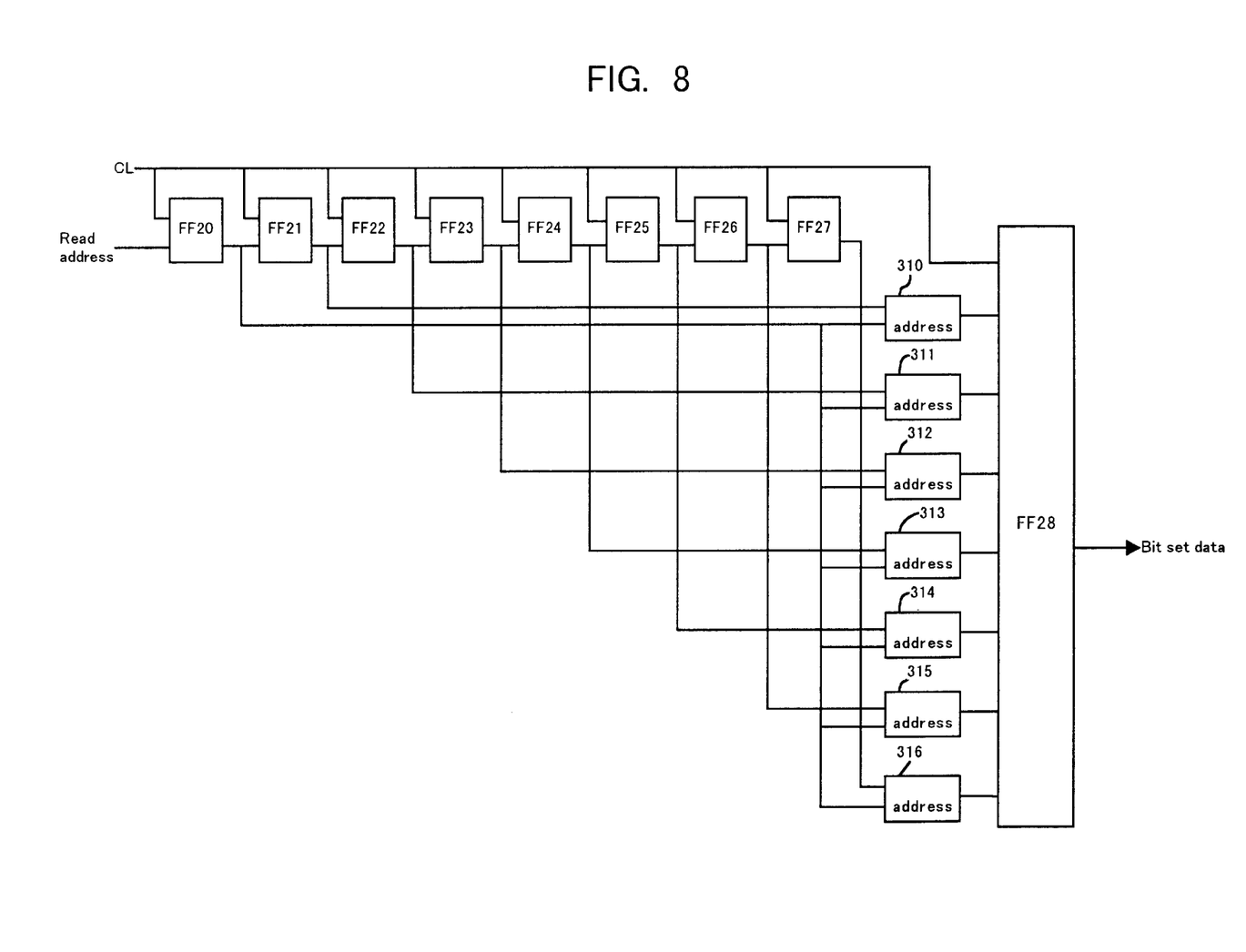
FIG. 8 is a block diagram illustrating an example arrangement of a bit set generator for a multi-address communication write table according to the embodiment of the present invention.
Figure 9A:
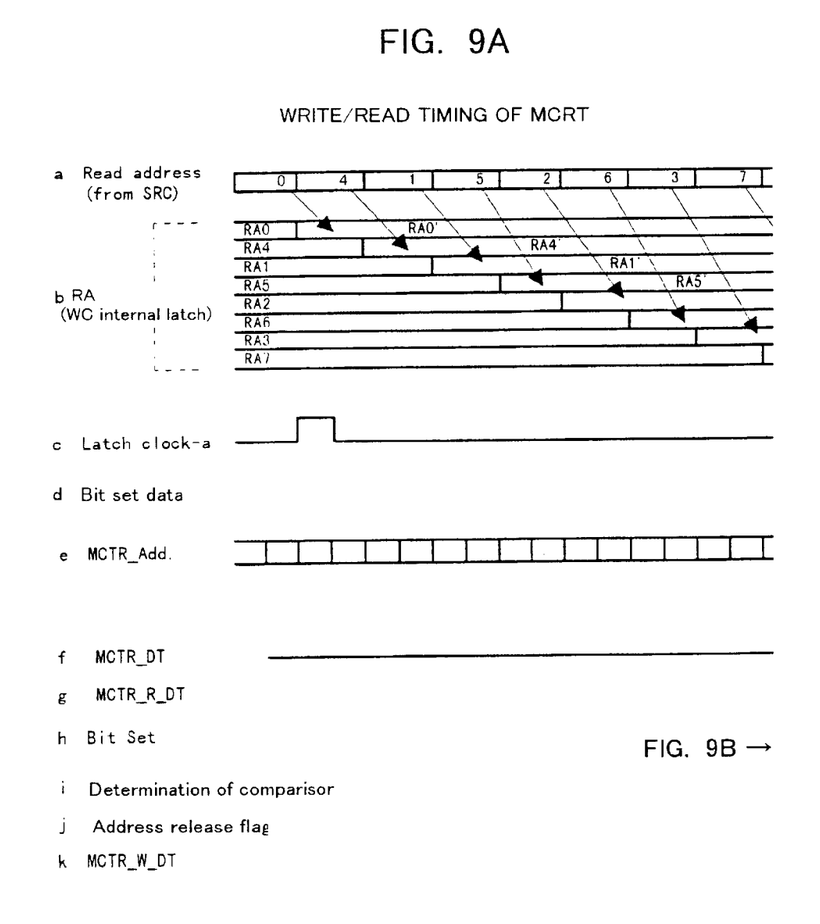
FIGS. 9A and 9B are time charts according to the embodiment in FIG. 4.
Figure 9B:
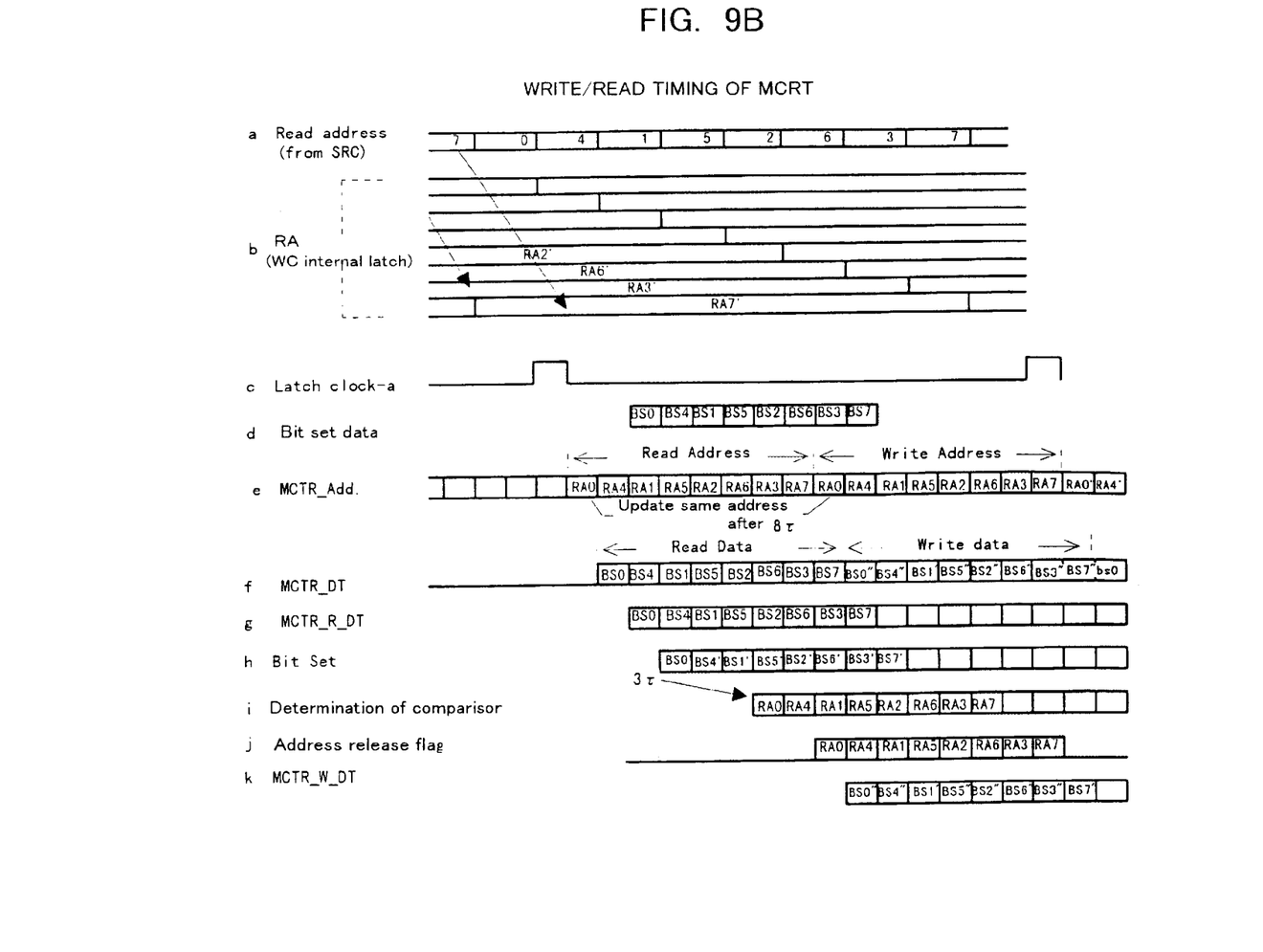

FIGS. 9A and 9B are time charts for the arrangements in FIGS. 7 and 8. In FIG. 9A, a read address $\alpha$ is latched by the write controller 2 at a latch clock (see c).

In accordance with the latched read address $\alpha$, bit set data are generated by the bit set generator 300 in FIG. 7 or 8 (see d). The address (see e) from the read controller 3 is updated and is written after 8 t has elapsed. The read address $\alpha$ is set by the read controller 3 (see g), a bit set is set (see h), and the two are compared.

The comparison result is obtained after 3 t has elapsed (see i). When the read address and the bit set match, the address release flag is output (see j). When the two do not match, re-write data (see k) are fed back to the flip-flops F1 to FF4 in FIG. 6.

As in the above description of the embodiment which is given while referring to the drawings, according to the present invention, the common buffer memory can be provided as an external memory, and a design for the memory which uses an LSI can be facilitated. Furthermore, since the memory access time can be freely designated, the flexibility of the circuit can be improved.

The above described embodiment is employed only for explaining the present invention, and the present invention is not limited to this embodiment. The protective scope of the present invention is defined by claims, and the equivalent of the range of the claims is also included within the protective scope of the present invention.

What is claimed is:

1. A method for releasing an address in a common buffering device, said method comprising the steps of:

setting for an ATM (Asynchronous Transfer Mode) cell to be transmitted to a specific line, a write address in the common buffering device;

writing the ATM cell at the write address in the common buffering device;

reading-out the ATM cell from an address position in the common buffering device, corresponding to the write address;

transmitting the read-out ATM cell to the specific line; and releasing the write address in the common buffering device;

wherein when the ATM cell is multicast to a plurality of lines, in the step of setting, the plurality of lines are set in a write control table;

in the reading-out step, each time the ATM cell is read-out from the write address in the common buffering device, a designation line for transmission of the read-out ATM cell, indicated in a read control table is compared with the plurality of lines set in the write control table; and in the releasing step, the write address is released when all designation lines for transmission of the read-out ATM cell coincide with the plurality of lines for multicast.

2. The method according to claim 1, wherein when a designation line for transmission of the read-out ATM cell indicated in said read control table is compared with said plurality of tines set in said write control table, the read control table is updated to add a line to which said ATM cell has been transmitted if the designation line does not coincide with any of the plurality of lines set in the write control table.

3. The method according to claim 1, wherein in the setting step of performing a check is done iii advance whether or not the same read addresses are present bit sets are generated in said read control table; and in the reading out step, a designation line for transmission of the read-out ATM cell indicated in the write control table is compared with the bit sets in the read control table.

4. The method according to claim 3, wherein said bit sets in the read control table are compared sequentially with each adjacent designation line in the write control table.

5. A common buffering device, comprising:

a common buffer memory storing ATM (asynchronous transfer mode) cells;

a write controller for setting a write address of said common buffer memory, at which an ATM cell to be transmitted to a specific line is to be written on the common buffer memory;

a read controller for reading out said ATM cell from said write address in the common butter memory to transmit said read-out ATM cell to the corresponding specific line;

a write control table for setting a plurality of lines to which the ATM cell written in said common butter memory is multicast; and a read control table for setting, each time said ATM cell is sent to each of said plurality of lines set in the write control table is read-out from the common buffer memory, a corresponding designation line to which said read-out ATM cell has been sent;

wherein said write controller releases the write address in the common buffer memory, when the write controller compares die plurality of lines set for multicast in said write control table with said designation line to which said ATM cell has been sent and determines the plurality of lines coinciding with all the designation lines.

6. The common buffering device according to claim 5, wherein said con-anon buffer memory, said write control table and said read control table are formed by an external memory.

7. A common buffering device comprising;

a common buffer memory storing ATM (asynchronous transfer mode) cells;

a write controller for setting a write address of said common buffer memory at which an ATM cell which to be transmitted to a specific line is to be written on the common buffer memory;

a read controller for reading said ATM cell from said write address in the common buffer memory to transmit said read-out ATM cell to corresponding specific line;

a write control table for setting a plurality of lines to the ATM cell written in said common buffering device is multicast;

a read control table for setting, each time said ATM cell is sent to each of said plurality of lines set in the write control table is road-out from the common buffer memory, a corresponding designation line to which said read-out ATM cell has been sent and determines the plurality of lines coinciding with all the designation lines;

wherein said write controller releases the write address in the common buffer memory, when the write controller compares the plurality of lines set for the coinciding with all the designation lines transmitted;

wherein said write controller comprises:

a register in which are sequentially set data indicating a destination line for the transmission of said ATM cell which is read by said read controller;

a bit map generator for reading an ATM cell written at the same address in said common buffer memory, and for generating a bit map which designates a transmission destination line;

a comparator for performing a comparison of said bit map generated by said bit map generator with a corresponding highway line in said write control table, for which the same write address has been set; and a controller for, upon receipt of the result of said comparison, feeding back to said register said data indicating which transmission destination highway line has been read for said ATM cell, or for clearing the contents of said write control table.

* * * * *